EFFECT OF CABOSIL IN POLYXYL B-STAGE RESINS 3,380,954
CONDENSED XYLENE-FORMALDEHYDE-
PHENOL PLYWOOD ADHESIVE
Robert D. Wesselhoft, Edgar C. Winegartner, Edward F. Wadley, and John L. Tveten, Baytown, Tex., assignors to Esso Research and Engineering Company
Filed Nov. 19, 1965, Ser. No. 508,686
11 Claims. (Cl. 260—38)

ABSTRACT OF THE DISCLOSURE

The viscosity of condensed xylene-formaldehyde-phenol plywood adhesive is controlled by adding to the adhesive a colloidal amorphous silica; the adhesive may be heated prior to addition of the colloidal silica or a finely divided solid drying agent, which may be a metal salt, may be added prior to addition of the colloidal silica.

---

Figure 1:
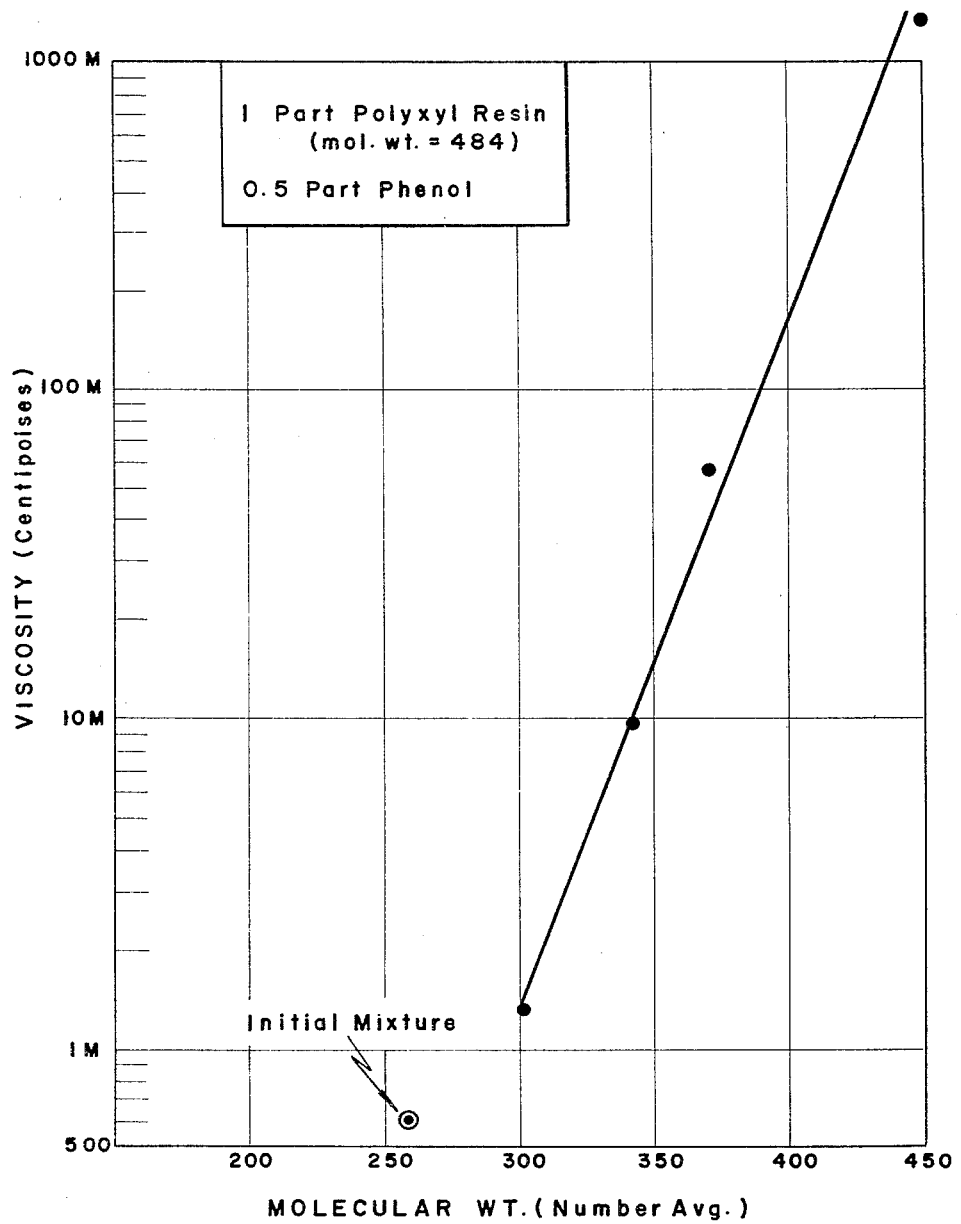

The present invention is directed to a plywood adhesive. More particularly, the invention is concerned with a plywood adhesive having a selected viscosity and improved viscosity index characteristics. In its more specific aspects, the invention is concerned with a composition and method for preparing same which is useful as an adhesive for plywood and the like.

The present invention may be briefly described as an adhesive suitable for use in manufacturing plywood which comprises a xylene-formaldehyde condensation product with phenol and colloidal amorphous silica having a particle size within the range from about 0.01 to about 0.025 micron.

The invention is also concerned with a method for preparing a plywood adhesive having controlled viscosity and viscosity index which comprises adding a colloidal amorphous silica having a particle size within the range from about 0.01 to about 0.025 micron to a xylene-formaldehyde condensation product with phenol.

The amount of the colloidal amorphous silica employed may range from about 0.5 to about 5.0% by weight of the condensation product. A preferred amount is in the range from about 1 to about 3% by weight. The amount of colloidal amorphous silica must be carefully controlled and must not exceed the amount stated. While as much as 5% by weight of silica may be present, it is preferred not to exceed 3% by weight since with the larger amounts there is danger of gellation occurring. When gellation occurs, it may be reduced or controlled either by heating, as described herein further, or by addition of a drying agent.

The plywood adhesive of the present invention may suitably contain a finely divided solid drying agent which may be a metal salt. Examples of the finely divided solid drying agent are calcium chloride, magnesium sulfate, calcium sulfate, and the like. The drying agent is suitably employed in an amount in the range from about 0.25% to about 2.0% by weight of the condensation product. A preferred amount is about 0.75% to about 1.75% by weight.

When the drying agent is employed in the practice of the present invention, the drying agent is added to the condensation product prior to addition of the silica.

In accordance with the present invention, the condensation product may be heated to a temperature in the range from about 250° F. to about 300° F. at pressures of about 5 mm. to about 760 mm. Hg absolute for about 3 to about 5 hours prior to the addition of the colloidal amorphous silica. A suitable temperature is 250° F. at 50 mm. Hg pressure for 3 hours or 300° F. at atmospheric pressure for about 0.5 to about 2 hours.

The xylene-formaldehyde condensation product contains over 13 weight percent oxygen, preferably from 13 to 17 weight percent. At oxygen contents lower than about 13 weight percent in the base resin, the adhesive properties, when spread on plywood, are not satisfactory.

The xylene-formaldehyde condensation product may be obtained by the acid-catalyzed reaction of xylene and formaldehyde. The xylene may be o-, m-, or p-xylene or, preferably, as an admixture thereof with ethylbenzene, since this is an easily obtained refinery stream. The m-xylene is the most reactive component, followed by o-xylene. Formaldehyde may be employed as such, or as formalin, paraformaldehyde, trioxane, etc. Paraformaldehyde is preferred. The acid catalyst is preferably a 20 to 80 weight percent aqueous sulfuric acid, although other acidic catalysts such as formic acid, trifluoroacetic acid, and aromatic sulfonic acids can be also be used.

The relative proportions of xylene, formaldehyde, and acid are selected to yield an acid/oil weight ratio of 0.02 to 10, and a xylene/formaldehyde mol ratio from 1 to 100.

The xylene and formaldehyde are continuously reacted in a stirred reaction zone in the presence of the catalyst under conditions including a residence time of 3 minutes to 4 hours, a temperature of 70° F. to 250° F., and a pressure sufficient to maintain at least a portion of each of the reactants in the liquid phase. Water is removed from the vapor phase which is withdrawn, and the remainder of the vapor phase is recycled to the reaction zone.

The reaction mass is withdrawn and settled to obtain an acid phase and a hydrocarbon phase, and the hydrocarbon phase is separated by decantation and neutralized (e.g., by adding sodium carbonate).

The neutralized hydrocarbon phase is fractionated in a distillation tower under a vacuum (e.g., at a pressure of 5 to 150 mm. Hg absolute), and at a bottom-of-tower temperature of 200° C. to 250° C.

A bottoms product boiling above 600° F. (corrected to 760 mm. Hg) is recovered which contains from 13 to 17 weight percent (preferably about 16 weight percent) combined oxygen. Two suitable xylene-formaldehyde condensation products are shown in the following Table I.

TABLE I.—TYPICAL PROPERTIES OF XYLENE-FORMALDEHYDE CONDENSATION PRODUCT

| Molecular weight | 510 | |
|---|---|---|
| Specific gravity, 60 60° F | 1.097 | 1.079 |
| Oxygen content, wt. percent | 16.1 | 16.9 |
| Viscosity, SSU at 210° F | 150 | 92 |
| Color, Gardner | 1 | 9 |

As can be seen by the above table, the viscosity and color may vary somewhat even at approximately the same oxygen content and specific gravity. The oxygen content is generally improved by increasing the cut-point; i.e., by recovering a bottoms product boiling above 665° F. (corrected) instead of 600° F. (corrected), the oxygen content can be increased.

Phenol incorporation reaction

The xylene-formaldehyde condensation product is reacted with phenol, by heating the condensation product and phenol at a temperature between 40° F. and 280° F. for a length of time suitable to produce the desired viscosity in the resin. The temperature and time employed in this stage is dependent upon the quantity of catalyst used, and upon the extent of prepolymerization (ultimate viscosity is a measure) that is desired. During this stage of the reaction, the molecular weight increases, as is evidenced by the increase in viscosity. The reaction may be stopped at the desired time by the addition of a stoichiometric quantity of potassium hydroxide or other base dissolved in a suitable solvent such as methanol.

As exemplary of how the time and temperature are variable, a resin was prepared using as a catalyst 1% by weight of xylene sulfonic acid, the condensation product and phenol being reacted at 40° F. for 64 hours. At the end of this time, the viscosity as measured with the Brookfield viscometer at 80° F. was 2000 centipoise. A similar mixture was prepared and was held at 120° F. for 10 minutes. At the end of the 10 minutes, the viscosity of the resin measured in the viscometer was again 2000 centipoise at 80° F.

In another run, a resin was held at 75° F. for 64 hours, at which time the viscosity at 80° F. was 32,000 centipoise. In another run, the same reactants were held at 125° F. for 30 minutes, at which time the viscosity had again reached 32,000 centipoise. In a third run, the same mixture of condensation product and phenol was mixed with 0.05% xylene sulfonic acid and was held at 220° F. for various periods of time, at the end of which the reaction was stopped by the addition of alcoholic potassium hydroxide, the alcohol boiled off, and the resin cooled to 80° F. The viscosity as measured at 80° F. with a Brookfield viscometer is shown below in Table II.

TABLE II.—INCREASE IN VISCOSITY WITH TIME

| Time, min.: | Brookfield viscosity at 80° F. |
| --- | --- |
| 5 | 1300 |
| 20 | 4300 |
| 40 | 21,500 |
| 60 | 110,000 |

Thus, it can be seen that time, temperature, and catalyst concentration affect the preparations of resins of a selected viscosity, and that the viscosity of the resin may be increased under constant conditions of concentration and temperature by increasing the time of reaction. However, control of reaction variables may not be always satisfactory in production of a resin for use as an adhesive of a desired viscosity since this may involve preparation of resins of many grades, none of which may be of the desired viscosity for a particular use. In accordance with the present invention, it is unnecessary to provide long reaction times or to control reaction variables to obtain a high viscosity resin or one of a selected viscosity. Thus, a low viscosity resin or condensation product with phenol may be produced and the viscosity of the resin controlled or increased to any level desired by addition of controlled amounts of the colloidal amorphous silica.

As has been set forth above, the weight ratio of phenol to xylene-formaldehyde condensation product is from 0.4 to 0.55 by weight. This is illustrated by a comparison of the acetone solubility of a number of resins prepared by the intercondensation of the xylene-formaldehyde condensation product with varying amounts of phenol. The solubility of the thermoset product is an indication of the thermosettability of the resin which, in the case of high oxygen content xylene-formaldehyde-phenol resins, is an indication of their suitability as a plywood adhesive.

In the tests shown in the table below, the phenol and xylene-formaldehyde condensation product were reacted in a beaker with 3% by weight xylene sulfonic acid (based on the total weight of phenol and xylene-formaldehyde condensate). The phenol, condensation product, and acid were well mixed in a beaker and the mixture placed in an oven at 300° F. for 30 minutes. At the end of this time, the reaction was complete. The solid material was removed from the oven, cooled, ground and dissolved in boiling acetone. The percent acetone-soluble material is an inverse indication of the degree of thermosetting for the material; that is, the more acetone soluble, the less thermoset.

TABLE III

| Phenol to polyxyl ratio: | Percent soluble in boiling acetone |
| --- | --- |
| 1.00 | 98.7 |
| 0.735 | 35.2 |
| 0.6 | 9.42 |
| 0.5 | 3.27 |
| 0.4 | 4.09 |
| 0.368 | 6.59 |
| 0.30 | 23.8 |
| 0.25 | 32.17 |
| 0.125 | 59.83 |

It is seen from Table III that a minimum acetone solubility occurred at the phenol-to-xylene-formaldehyde condensate ratio at about 0.5, and was at essentially this minimum within the range from about 0.4 to about 0.55. Experiments in using the various phenol-to-polyxyl ratios in plywood adhesives have confirmed that at a phenol-to-condensation product ratio less than 0.4, or above about 0.55, the adhesive qualities are not satisfactory.

The neutral adhesive can be stored indefinitely. When desired for use, from 3 to 5 weight percent (based on adhesive) of an acid catalyst (such as xylene sulfonic acid) and the colloidal amorphous silica are added and the adhesive is then spread and thermoset.

While the invention is not limited to any specific xylene-formaldehyde condensation product with phenol, typical properties including a range of properties and preferred properties of such xylene-formaldehyde phenol resins are given in the following table.

TABLE IV

| | Range | Preferred |
| --- | --- | --- |
| Viscosity (centipoises at 80° F.) | 2,000–10,000 | 3,000 |
| Molecular Weight (Avg.) | 250–350 | 325 |
| Oxygen Content | 13.5–15 | 14 |
| Specific Gravity | 1.08–1.10 | |

Also, reference to FIG. 1 illustrates the variation in viscosity of the resin with the number average molecular weight.

Figure 2:
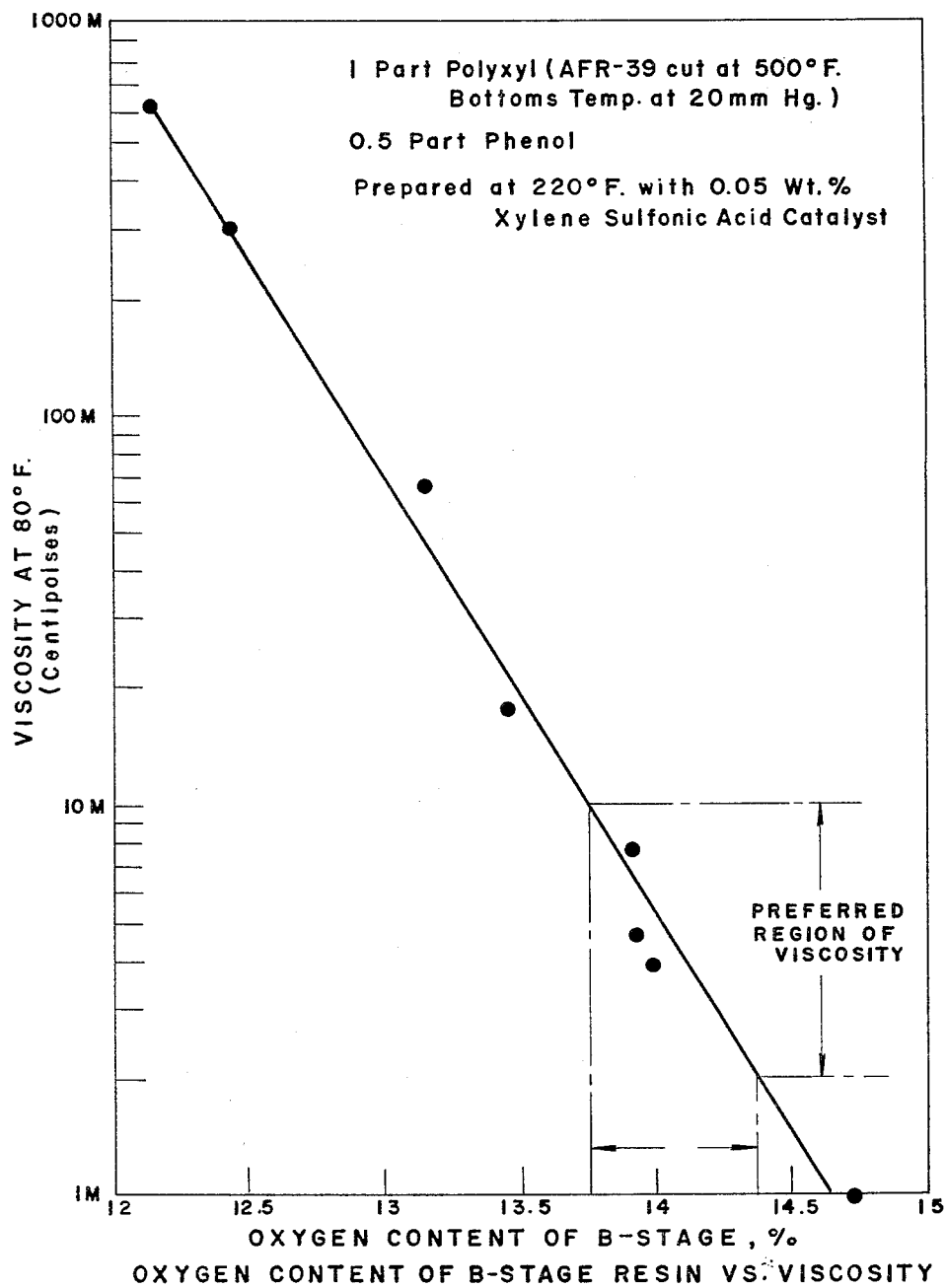

Reference to FIG. 2 shows the variation of the oxygen content of the xylene-phenol resin with the viscosity and shows a preferred region of viscosity for the practice of the present invention.

In its most specific aspect, as above stated, the present invention relates to the preparation of a plywood adhesive in which viscosity is controlled by addition of colloidal amorphous silica. The evaluation of adhesives for plywood use is governed by the Department of Commerce specifications for Douglas fir plywood as set out in CS 45–60. Coupons are tested by pulling apart after two boiling cycles and inspecting to see whether the wood failed or whether the glue failed. A 100% wood failure indicates that the glue did not fail at all. The Department of Commerce specification requires a minimum average of 80% wood failure for commercial board, but it will be understood that the adhesive which produces less than 80% wood failure may be used in producing the so-called "mill-certified plywood."

Thus, the present invention is concerned with an improved plywood adhesive comprising the condensation product of formaldehyde-xylene condensation products with phenol. In employing these condensation products as plywood adhesives, a variable which must be controlled in order to produce a satisfactory bond between wood veneers, is the rate and degree of penetration of adhesive into the wood. Thus, the adhesive must flow sufficiently to penetrate through the outer eight to ten layers of wood fibers on the surface, which are generally damaged by the veneer lathe so that the bond is made to solidly attached wood fibers. On the other hand, the penetration must not be significantly greater than this or excess adhesive is required to maintain a layer in the "glue line" between veneers. Thus, a complex relationship exists between the decrease in viscosity with increasing temperature, the increase in viscosity due to thermosetting, and the resulting rate of penetration of the adhesive into the wood when the plywood is produced by heating under pressure in a hot press. Thus, the present invention is concerned with the employment of colloidal amorphous silicas, such as pyrogenic colloidal silica in xylene-formaldehyde condensation products with phenol to improve the viscosity index of the condensation product or resin as it is termed herein. These colloidal amorphous silicas, such as pyrogenic colloidal amorphous silicas, have extremely small particle sizes and large external surface area. In the following table there are presented mechanical and physical properties of the colloidal amorphous silica.

TABLE V

Silica content (moisture-free
 basis) _____ percent__ 97–99.7
Free moisture (105° C.) _____ do____ [1] 0.2–2.0
Ignition loss (1000° C.) _____ do____ 0.2–1.0
Calcium oxide, magnesium oxide ____ do____ 0.00
$Fe_2O_3+Al_2O_3$ _____ do____ 0.01
Particle size range _____ microns__ 0.005–0.25
Surface area (nitrogen absorption)__m.²/g__ 175–300
Specific gravity _____ 2.1–2.2
Color _____ White
Refractive index _____ 1.55
pH (4% aqueous dispersion) _____ 3.5–4.2
Bulking value _____ gal/lb__ 0.057
Apparent bulk density _____ lb/ft³__ 2.5–7

[1] Excluding moisture 3.0% max.

While the foregoing table sets out chemical and physical properties of a colloidal amorphous silica, other colloidal amorphous silicas may be used, such as those having a silica content of 90–92%, a pH of 4%, aqueous dispersion of 4.1, a surface area in square meters per gram (nitrogen absorption) of 398, a bulk density in pounds per cubic foot of 2.9 and having a particle size range in microns of 0.01 to 0.02. Other finely divided amorphous silicas may suitably be used.

In the practice of the present invention, it appears that the surface area as indicated by particle size is a factor which determines the amount of colloidal amorphous silica which is required. Thus, an 0.022 micron particle size silica may require larger amounts of that silica than other colloidal amorphous silicas of smaller size.

Figure 3:
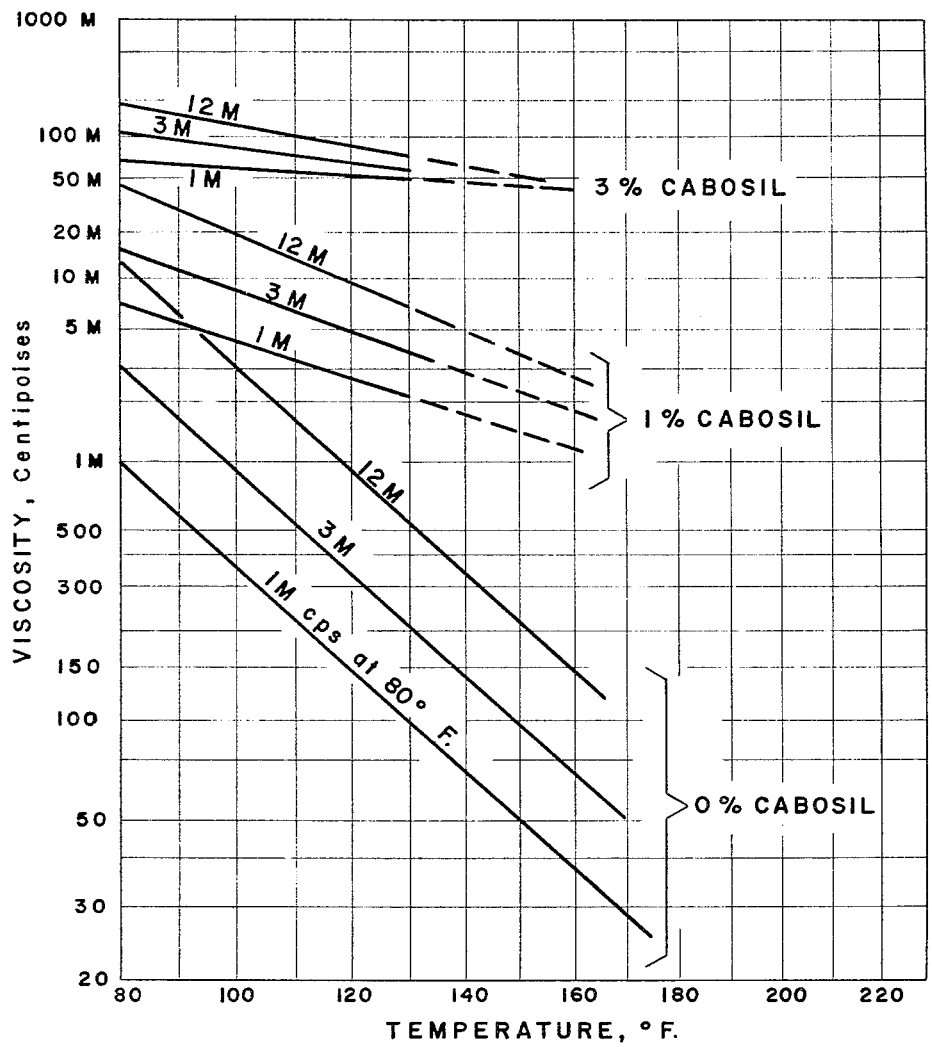

In order to illustrate the invention further, reference is had to FIG. 3 of the drawing to illustrate the function of colloidal amorphous silicas, such as Cab-O-Sil, in producing a superior plywood adhesive. In the figure, three families of curves are shown at different levels of colloidal amorphous silica. Referring to the line labeled 1000 centipoises (cps.) at 80° F., in each family, it may be seen that at 150° F., with no colloidal amorphous silica, the viscosity drops to 50 centipoises (cps.); with 1% colloidal amorphous silica, the viscosity is about 1200 centipoises, while with 3% colloidal amorphous silica, the viscosity is about 40,000 centipoises (cps.). The viscosity in the temperature range for 80° F. and 160° F. is believed to be very important in determining the rate of penetration of the adhesive or resin into the wood substance. The very striking effects on the viscosity of the small amounts of colloidal amorphous silica in the xylene-formaldehyde condensation product with phenol result in the beneficial effects of the colloidal/amorphous silica on the plywood quality.

In order to illustrate the invention further, a number of tests were made, the results of which are illustrated in the following table wherein the beneficial effects of colloidal amorphous silica are shown in two resins, one of 3,000 centipoises and the other of 12,000 centipoises. The data are more striking at short assembly times than at longer assembly times. Assembly time refers to the period of time elapsed between spreading the adhesive on the veneer and pressing the several layers into plywood. The "Load" column refers to the pounds per square inch of shear strength, and the "% Wood" column lists the percent of fracture occurring in the wood substance rather than the glue line when specimens were boil-tested in accordance with the aforementioned Commercial Standard 45–60 which requires an average of 80% minimum wood failure.

TABLE VI

| Glue | Percent Colloidal Amorphous Silica | Assembly Time, 1 Hour | |
|---|---|---|---|
| | | Load, p.s.i. | % Wood |
| 3M cps. resin, 4% xylene-sulfonic acid. | 0 | | |
| | 1 | 134 | 71 |
| | 1½ | | |
| | 2 | 124 | 84 |
| | 2½ | | |
| | 3 | 120 | 87 |
| 12M cps. resin, 4% xylene-sulfonic acid. | 0 | | |
| | ½ | | |
| | 1 | 135 | 72 |
| | 2 | 137 | 82 |
| | 3 | 129 | 78 |

The next table illustrates the reproducibility of panels produced using several batches of resin and panels made on different days both with and without the addition of colloidal amorphous silica. Each of the batches contained, additionally, two weight percent of paraformaldehyde powder which was added and four weight percent xylenesulfonic acid catalyst. Twelve panels were made with each resin and each panel cut into ten specimens which were then tested in boiling tests as specified in Commercial Standard 45–60. It may be seen that at one hour assembly times, the panels containing colloidal amorphous silica averaged much better than those without the colloidal amorphous silica. Again, at short assembly times, the effect is quite noticeble. These results are shown in the following table:

TABLE VII

| Resin | With 2½ Parts Colloidal Amorphous Silica, 1 hr. Assembly | | Without Colloidal Amorphous Silica 1 hr. Assembly | |
|---|---|---|---|---|
| | Load p.s.i. | % Wood | Load p.s.i. | % Wood |
| 1 | 126 | 89.3 | | |
| 2 | 128 | 89.3 | | |
| 3 | 125 | 81.0 | 123 | 52 |
| 4 | 131 | 76.0 | | |
| 5 | 132 | 80.6 | 131 | 63 |
| 6 | 125 | 82.5 | | |
| 7 | 95 | 82.9 | 140 | 64 |
| 8 | 100 | 84.0 | | |
| Average | 120 | 83.3 | 131 | 59.9 |

The use of colloidal amorphous silica has another beneficial effect in a resin or xylene-formaldehyde condensation product with phenol. Thus, if a resin having a viscosity of 100,000 centipoises at 80° F. is used, there are difficulties in spreading this resin onto the veneer. In fact, the glue spreader must be heated to about 120° F. in order to spread this high viscosity material. This leads to other difficulties such as rapid advancing of the adhesive on the glue spreader. On the other hand, a 3,000 cps. resin with 3% colloidal amorphous silica has a viscosity at 80° F. of 100,000 cps. and, in addition, the material with colloidal amorphous silica is highly thixotropic so that under shear conditions of the doctor roll on the glue spreader, the effective viscosity is essentially that of the 3,000 cps. material. That is, the colloidal amorphous silica-containing resin exhibits a viscosity of 100,000 cps. but spreads similarly to a resin free of colloidal amorphous silica having a viscosity of 3,000 cps. Also, as shown in FIG. 3, the viscosity at elevated temperatures is actually much higher than a 100,000 cps. resin without the colloidal amorphous silica because of the improved viscosity index.

Another feature of the present invention is that heating the xylene-formaldehyde condensation product with phenol to 250° F. under 26" of Hg vacuum for three hours removes approximately 3½% of the starting weight. Other heating conditions may be obtained such as temperatures up to 300° F. at atmospheric pressure for 60 minutes to remove light components and produce similar results. The material removed is approximately 60% water and 25% formaldehyde and the remainder is methanol which was added with the acid catalyst used in the reaction of the xylene-formaldehyde condensation product with phenol. The removal of these materials from the resin changes the gel character of the material on the addition of the colloidal amorphous silica. For example, the addition of 2½% colloidal amorphous silica to the heat-treated resin produces a final viscosity of 8,000–10,000 c.p.s. rather than the approximately 50,000–60,000 c.ps. material which would be produced, as shown in FIG. 3. This is an important practical feature in that the resin containing colloidal amorphous silica may be pumped after heating, whereas the unheated material may be difficult to handle due to its gelled nature. Adhesive quality of the amorphous silica-containing resin is also improved.

The adhesives prepared in accordance with the present invention containing colloidal amorphous silica are sometimes difficult to handle at ordinary temperatures. As stated above, heating under reduced pressures at elevated temperatures provides a resin which does not gel on the addition of the colloidal amorphous silica. Thus, the adhesive containing colloidal amorphous silica is easily handled, and yet the effect of colloidal amorphous silica is maintained in the heating press.

This same effect may be obtained without the use of reduced pressures and/or high temperatures by adding to the resin a small amount within the range from about 0.25% to about 2.0% by weight of a finely divided solid drying agent. It has been found that a small amount, about 1% by weight of calcium chloride or magnesium sulfate mixed with the xylene-formaldehyde condensation product with phenol prior to addition of colloidal amorphous silica results in a fluid resin at ordinary temperatures instead of a gel. Thus, the final viscosity of the adhesive of the present invention may be controlled by controlling the amount of the finely divided drying agent.

The present invention has been described and illustrated by addition of the colloidal silica to the resin subsequent to its manufacture and prior to its use; however, the colloidal silica may be added to the resin during its manufacture. For example, in the preparation of the xylene-formaldehyde condensation product with phenol, the colloidal silica may be added along with the xylene-formaldehyde condensation product and phenol and catalyst, and the whole mixture reacted. However, it may be preferred to add the colloidal silica after the reaction of the xylene-formaldehyde condensation product with phenol.

The present invention is therefore quite important and useful and allows the preparation of an adhesive suitable for use in plywood manufacture and in other uses which has a controlled viscosity index, and allows the obtaining of very useful results which heretofore were not obtainable without controlling the reaction by way of which the resin is produced.

The nature and objects of the present invention having been fully described and illustrated and the best mode and embodiment contemplated set forth, what we wish to claim as new and useful and secure by Letters Patent is:

I claim:

1. A condensed xylene-formaldehyde-phenol plywood adhesive which comprises a xylene-formaldehyde condensation product with phenol having a ratio of phenol to xylene-formaldehyde within the range from about 0.4 to about 0.55 and containing from about 0.25% to about 5.0% by weight of colloidal amorphous silica having a particle size within the range from about 0.005 to about 0.25 micron.

2. A plywood adhesive in accordance with claim 1 containing finely divided solid drying agent.

3. A plywood adhesive in accordance with claim 2 containing from about 0.25% to about 2.0% by weight of said drying agent.

4. A plywood adhesive in accordance with claim 3 in which the drying agent is calcium chloride.

5. A plywood adhesive in accordance with claim 3 in which the drying agent is magnesium sulfate.

6. A plywood adhesive in accordance with claim 2 in which the drying agent is a metal salt.

7. A method for preparing a condensed xylene-formaldehyde-phenol plywood adhesive which comprises adding a colloidal amorphous silica having a particle size within the range from about 0.01 to about 0.025 micron to a xylene-formaldehyde condensation product with phenol, said colloidal silica being added in an amount within the range from about 0.25% to about 5.0% by weight based on the condensation product and said condensation product having a rato of phenol to xylene-formaldehyde within the range from about 0.4 to about 0.55.

8. A method in accordance with claim 7 in which a finely divided solid drying agent is added to said condensation product prior to addition of said silica.

9. A method in accordance with claim 8 in which the drying agent is calcium chloride.

10. A method in accordance with claim 8 in which the drying agent is magnesium sulfate.

11. A method in accordance with claim 7 in which the condensation product is heated to a temperature from about 250° F. to about 300° F. at pressures from about 5 mm. to about 760 mm. Hg absolute for about 0.3 to about 5 hours prior to addition of said silica.

References Cited

UNITED STATES PATENTS

| | | |
|---|---|---|
| 2,954,360 | 9/1960 | Krzikalla et al. |
| 3,165,558 | 1/1965 | Tmoto et al. |
| 3,303,167 | 2/1967 | Kakiuchi et al. |

MORRIS LIEBMAN, *Primary Examiner*,

JULIUS FROME, *Examiner*.

L. T. JACOBS, *Assistant Examiner*.